United States Patent [19]

Harper et al.

[11] 4,069,663
[45] Jan. 24, 1978

[54] THRUST REVERSER FOR BY-PASS GAS TURBINE ENGINE

[75] Inventors: Leslie Richard Harper, Bristol; William James Lewis, Winscombe; David Roberts McMurtry, Wotton-under-Edge; Lance Peter Bell, Avon; John Matthew Hall, Backwell, near Bristol, all of England

[73] Assignee: Rolls-Royce (1971) Limited, Great Britain

[21] Appl. No.: 700,477

[22] Filed: June 28, 1976

[30] Foreign Application Priority Data

July 15, 1975 United Kingdom ............... 29574/75

[51] Int. Cl.² ........................... F02K 1/20; F02K 3/06
[52] U.S. Cl. .................................... 60/226 A; 60/230; 60/266; 239/265.27
[58] Field of Search ................. 60/226 A, 226 R, 230, 60/262, 200 A, 266; 239/265.27, 265.29

[56] References Cited

U.S. PATENT DOCUMENTS

| 3,550,855 | 12/1970 | Feld et al. | 60/230 |
| 3,616,648 | 11/1971 | Weise | 60/226 A |
| 3,856,239 | 12/1974 | Leibach | 60/226 A |

OTHER PUBLICATIONS

"Gas Turbine Engine," Pratt & Whitney Oper. Instr. 200, May, 1974, p. 219.

*Primary Examiner*—Robert E. Garrett
*Attorney, Agent, or Firm*—Stevens, Davis, Miller & Mosher

[57] ABSTRACT

A by-pass gas turbine engine capable of producing an unmixed exhaust stream which comprises a core of hot turbine exhaust gases surrounded by an annular layer of by-pass air, is combined with a target thrust reverser. The ratio of the total pressure of the by-pass air to the total pressure of the turbine exhaust gases is arranged to be greater than unity to a significant extent, and the buckets are made from lightweight materials such as titanium, light alloys or even fiber re-inforced composite materials.

9 Claims, 11 Drawing Figures

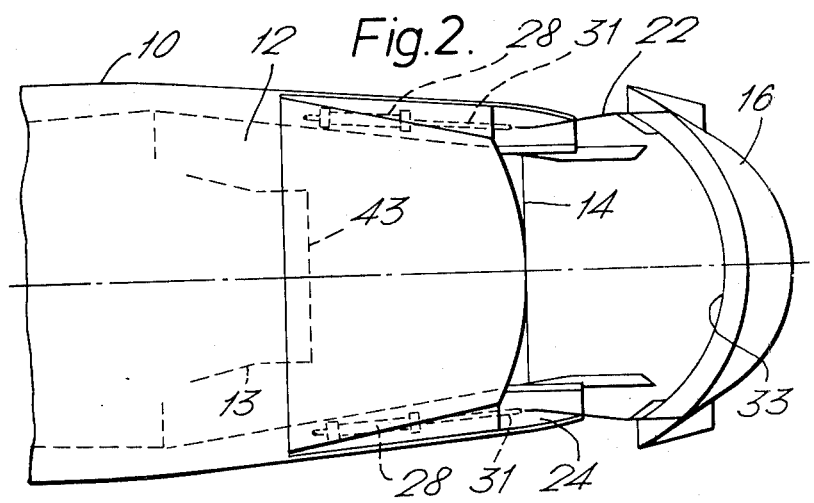
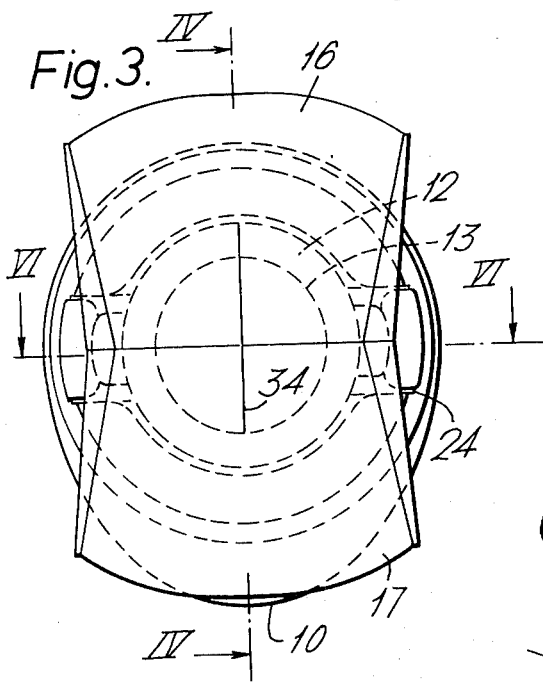
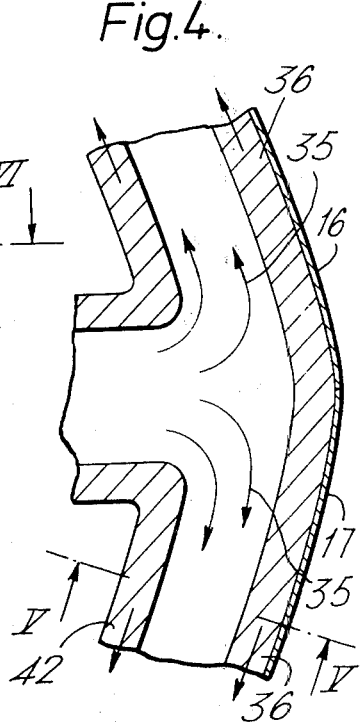

THRUST REVERSER FOR BY-PASS GAS TURBINE ENGINE

The present invention relates to improvements in gas turbine engines and has particular reference to a combination of a gas turbine engine and a thrust reverser.

It is known to provide so-caled target thrust reversers in which a pair of curved buckets are movable from a position adjacent to the jet pipe of a gas turbine engine to a position downstream thereof in which they cooperate to deflect the exhaust gases of the engine in a radially outward and forward direction thereby achieving a substantial braking effect on an aircraft in which the engine is installed.

It is a characteristic of such thrust reversers that the gas flow reversed by them is not discharged in all possible radial directions around the periphery of the jet pipe but primarily in two selected radial and diametrically opposite directions. By choosing the position of these two radial directions the reversed gases can be discharged away from light alloy aircraft structure. The operating linkage for each of the thrust reverser buckets is conveniently disposed to either side of each of the chosen radial directions. Such thrust reversers have previously been used in conjunction with certain bypass engines to divert both the relatively hot core engine exhaust and the relatively cold bypass flow of the engine, but, it has always been deemed to be necessary to construct the thrust reverser buckets of materials capable of withstanding the relatively high temperatures encountered in the relatively hot core exhaust. Unfortunately such materials, i.e. those capable of withstanding high temperatures, are always relatively heavy and expensive. The present invention has for its object to provide a target-type thrust reverser capable of simultaneously diverting both the relatively hot core exhaust and the relatively cold bypass flow which is constructed using relatively lightweight materials for example, light alloys or composites not capable of withstanding the relatively high temperatures of the core engine exhaust. By "not capable of withstanding" is meant that the safe working temperature of the material is below that of the core engine exhaust and almost any exposure of the material to the hot gas exhaust would result in damage to the material.

We have found that under certain circumstances a surprising effect occurs whereby the relatively cool bypass flow can be made to pass over the surface of the thrust reversing buckets and thereby isolate them from the effects of the relatively hot core engine exhaust.

According to the present invention there is provided a by-pass gas turbine engine adapted to produce a substantially unmixed exhaust gas stream which consists of a central core of relatively hot turbine exhaust gases surrounded by an annular flow of relatively cooler by-pass air, and combined with a target thrust reverser as hereinbefore defined, wherein the ratio of the total pressure of the by-pass air flow to the total pressure of the hot exhaust gas flow is greater than unity to a sufficient extent that the by-pass flow forms a relatively cooler barrier layer over the surfaces of the buckets to isolate said surfaces from the relatively hot exhaust gases, and the buckets are of a relatively lightweight construction which includes material the safe working temperature of which is lower than the temperature of the exhaust gases.

In more specific terms the present invention provides in combination a by-pass gas turbine engine comprising, a core engine for producing a relatively hot exhaust gas flow, compressor means for producing a relatively cooler by-pass air flow, said core engine having a casing and a nozzle through which said exhaust gas flows in a first exit plane, a by-pass casing surrounding the core engine and defining with the core engine casing an annular by-pass flow passage which terminates in a second nozzle having an exit plane in the region of said first exit plane whereby the engine produces a fluid stream consisting of a central core of said relatively hot exhaust gas surrounded by an annular flow of said relatively cooler bypass air, and a thrust reverser having a pair of buckets and means for moving the buckets from a stowed position in which they lie clear of said fluid stream, to an operative position in which they lie downstream of the exit planes of both nozzles and across said fluid stream to deflect the stream, the combination being characterised in that the ratio of the total pressure of the by-pass flow to the total pressure of the core engine exhaust gas flow is greater than unity to a sufficient extent that the by-pass flow forms a relatively cooler barrier layer over the fluid-contacting surfaces of the buckets to isolate the surfaces of the buckets from the hot core engine exhaust flow, and the buckets are of a relatively lightweight construction which includes material the safe working temperature of which is lower than that of the hot exhaust gas flow.

Examples of lightweight materials which may be used in the construction of a thrust reverser of the present combination, are aluminium alloys, titanium, or fibre-reinforced resin composites, for example carbon or boron fibre-reinforced composites.

The thrust reverser buckets are preferably made from a single skin of the lightweight material in order to produce an even greater weight saving.

The flow of the relatively cooler bypass flow over the thrust reverser buckets is characterised by two portions of the bypass flow, one adjacent each side of the operating linkage for the thrust reverser buckets, which flow axially rearwards until they encounter the thrust reverser bucket surfaces when they flow initially radially inwards across the face of the buckets until they meet, when they then turn through substantially 90° to flow radially outwardly in the direction of discharge of the reversed exhaust gases.

According to a modification of the invention a relatively small target of high temperature resistant material is positioned upstream of the thrust reverser buckets facing the hot core efflux to further assist in preventing the hot core efflux reaching the relatively low temperature material of the thrust reverser buckets and wherein the target is spaced from the thrust reverser buckets to allow the flow of relatively cool bypass air between the target and the buckets.

The target may be connected to the buckets for deployment toegether therewith.

In a further modification a hole is produced in the thrust reverser buckets to promote the flow of bypass air behind the target by producing a leakage flow rearwardly through the hole.

In a yet further modification a hole is produced in both the target and the thrust reverser buckets whereby leakage of hot core flow through the target and the thrust reverser buckets induces a flow of cooling bypass air between the target and the thrust reverser buckets.

An embodiment of the invention will now be described by way of example only and with reference to the accompanying drawings in which:-

FIG. 2 is a view of the engine of FIG. 1 in the direction of arrow II.

FIG. 3 is a view of the engine of FIG. 1 taken in the direction of arrow III.

FIG. 4 is a diagrammatic view of the flow pattern of the reversed gases from the engine as viewed in the direction IV — IV of FIG. 3.

Figure 1:
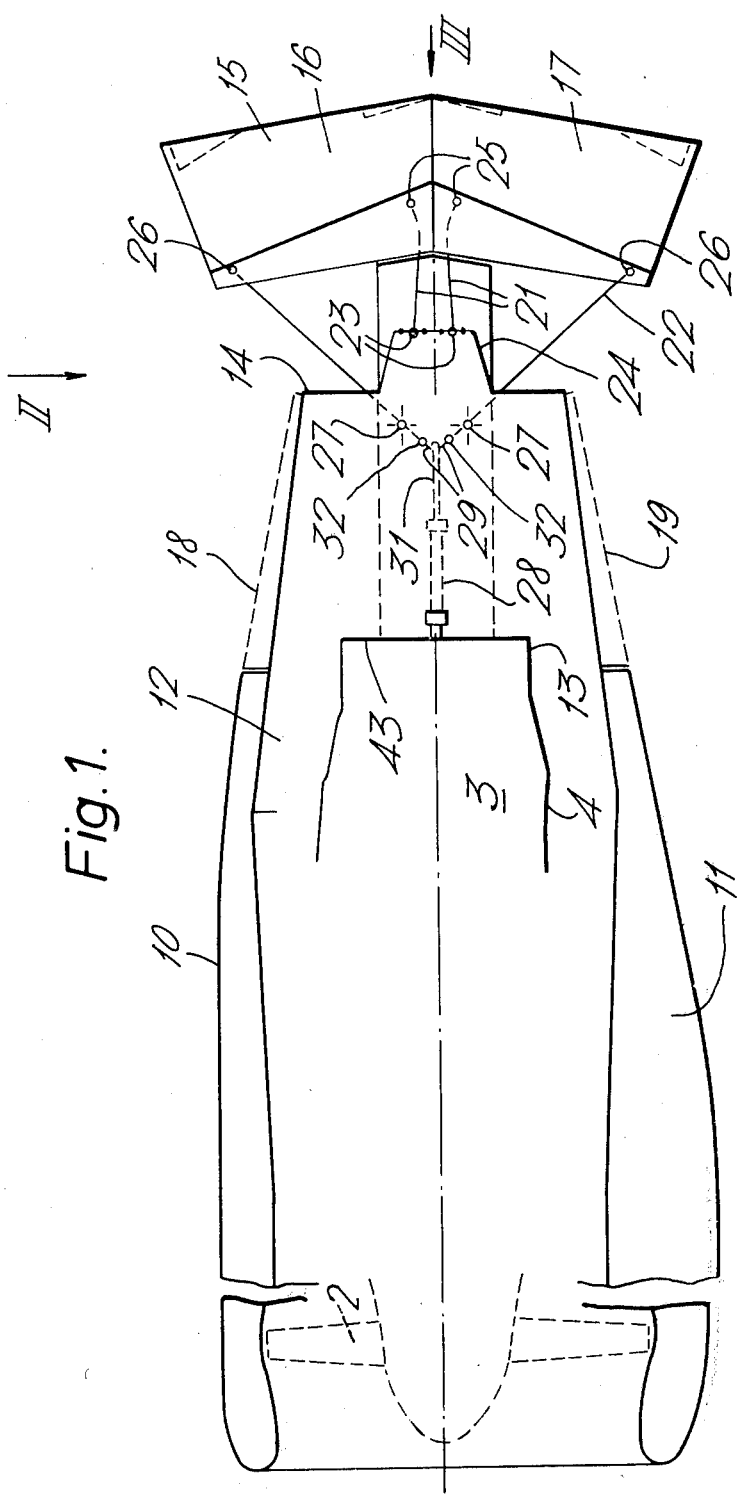
FIG. 1 is a longitudinal section through a gas turbine engine showing a bucket thrust reverser deployed at its downstream end.

Referring now to FIG. 1 there is shown a by-pass casing 10 of a bypass gas turbine engine 11 in which a fan 2, supplies relatively cool bypass air to an annular duct 12 formed between the by-pass casing and the casing 4 of a core engine 3 which drives the fan in conventional manner. At the downstream end of the core engine is an exhaust duct 13 which terminates in an exhaust nozzle having an exit plane 43 just upstream of the discharge end 14 of the by-pass casing 10.

Downstream of the discharge end 14 of the by-pass casing there is shown deployed a target-type thrust reverser 15 which, in well known manner, comprises a pair of buckets 16, 17 each movable to its deployed position from a respective stowed position 18, 19 shown in dotted lines in which they overlie the downstream end of the by-pass casing 10. Each thrust reverser bucket is held in position against the force of the gas efflux from the engine by two pairs of links 21, 22 in well-known manner, one link of each pair being attached to a respective side of the bucket.

The pairs of links 21 are of a fixed length and at their upstream ends are pivotably connected to fixed pivots 23 supported to fixed structures 24 attached to the by-pass casing, and at their downstream ends the pairs of links 21 are pivotally connected to the thrust reverser buckets at points 25. The longer pairs of links 22 are pivotally connected at 26 to the radially outer ends of each respective bucket and are pivotally connected at a point 27 part way along their length to the fixed structures 24. The buckets are deployable in known manner by means of a pair of hydraulic rams 28 carrying intermediate pivoted links 29 at the end of their extensible portions 31 which connect by pivots 32 to respective links of the link pairs 21.

Further detail of the shape of the thrust reverser buckets will be apparent by referring also to FIGS. 2 and 3 from which it will be seen that each bucket presents a concave surface 33 to the flow of gas leaving the engine and that these concave surfaces are inclined towards the gas flow so as to produce reverse thrust by changing the direction of gas flow from rearwards to radially outwards and forwards. The general radial direction of flow from the thrust reverser is arranged to lie in an axial plane such that the hot reversed gases do not impinge on any of the structure of the engine or aircraft in which the engine is mounted.

Figure 5:
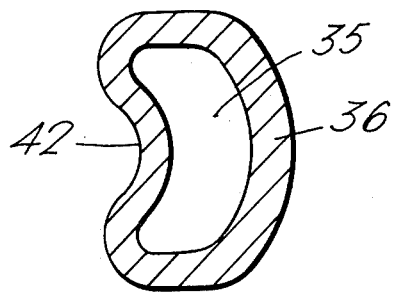
FIG. 5 is a further diagrammatic view of the flow pattern of the reversed gases from the engine as viewed in the direction V — V of FIG. 4.
Figure 6:
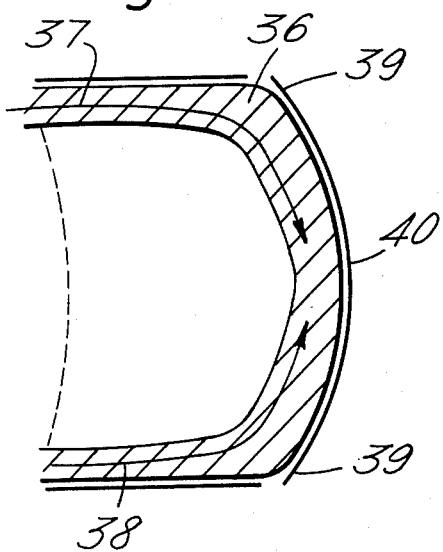
FIG. 6 is a further diagrammatic view of the flow pattern of the reversed gases from the engine as viewed in the direction VI — VI of FIG. 4.

Turning now to FIGS. 4, 5, 6 there are shown some pictorial flow diagrams which illustrate the pattern of outflow that is achieved from the thrust reverser.

Looking first at FIG. 4 it will be seen that the radial and forward outflow of hot core exhaust gases 35 is surrounded by relatively cold bypass gasses and in particular that the buckets 16, 17 are in fact lined with a layer of moving cold gas 36. Turning now to FIG. 6 it will be seen that the cold gas reaching the buckets is supplied by the portion of bypass flow that leaves the engine at the sides adjacent the operating linkage for the thrust reverser or in otherwords in an axial plane at ninety degrees to the axial plane in which the reverser gas flows leave the engine. Thus the bypass flows 37, 38 one adjacent each side of the operating linkage flow initially rearwardly until they encounter the edges 39 of the buckets which cause them to turn and flow radially inwardly until they meet at the centre of the buckets, where they turn through 90° and flow radially outwardly as shown by the arrows of FIG. 4.

In FIG. 5 it will be seen that the net effect of the various flow processes is to leave in the two radially outward and forward reversed flows a central core 41 of hot gas everywhere surrounded by a sheath 42 of relatively cool gas.

We have found that this surprising occurrence only occurs when the total pressure of the bypass flow, as measured at the exit plane 43 of the exhaust flow from the core engine, is greater than the total pressure of the core exhaust flow. Thus, providing this feature is observed, the lining of the thrust reverser buckets by relatively cool bypass gas may be relied upon to allow the thrust reverser buckets to be made from light aluminium alloys or reinforced plastic materials or other light weight materials that are not capable of withstanding the relatively high temperatures occuring in the core engine exhaust. This use of lightweight material then gives a significant advantage in terms of savings in weight over conventional thrust reversers.

It will be apparent from the drawings that the support structure 24 for the operating linkage extends almost the entire distance from the fan cowl 10 to the thrust reverser 5 and it may be thought that this is responsible for causing the achieved flow distribution. We have found, however, that the same flow distribution is achieved if this structure is deleted. The effect is, however, improved if the "wrap" of the buckets i.e. their concavity is increased.

We have found that the best results are obtained when the exit planes 14 and 43 of the bypass air nozzle and the exhaust gas nozzle respectively are in the same region, i.e. they are co-planar, or one is only a little upstream of the other. If, for example, the bypass air nozzle 14 is too far upstream of the exhaust gas nozzle exit plane 43 they bypass flow spreads more quickly and is not wholly captured by the buckets, so penetration by the hot exhaust gases of the cooler layer of air on the bucket surface occurs more readily. On the other hand, if the by-pass air nozzle plane 14 is too far downstream of the inner exhaust gas nozzle plane 43, too much mixing of the hot and cold flows can occur and the relatively cooler annular bypass flow becomes too thin to establish the protective layer on the bucket surface. Simple experimental tests for a given pressure ratio of engine will establish the safe limits for the relative dispositions of the nozzles.

The invention is particularly applicable to those bypass engines having a bypass ratio in the range from 1 to 5. Below a bypass ratio of 1 the amount of bypass air is relatively small and would have to be at a prohibitive excess pressure over the pressure of the exhaust gas flow to enable the cooler layer to be maintained on the bucket surface.

At a bypass ratio of about 5 there is usually sufficient reverse thrust available by reversing the bypass flow only so that a different situation arises and both flows need not be reversed.

Figure 11:
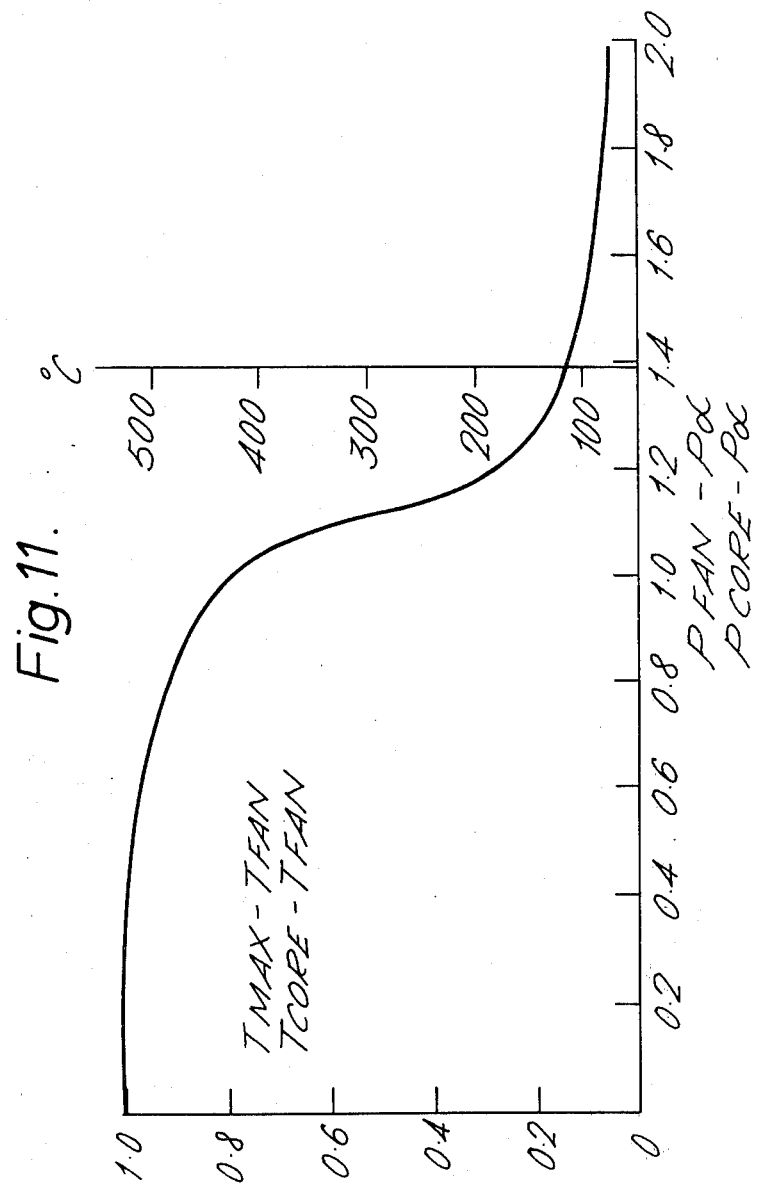
FIG. 11 is a curve showing the relationship between the pressure ratio of the flows and bucket temperature.

The pressure ratio of the two flows forms a very important part of the invention and FIG. 11 is a graph representing the variation of maximum skin temperature on the bucket surface plotted in non-dimensional form, against the pressure ratio between the two streams, measured as a gauge pressure. The right hand scale records the actual bucket surface temperature.

On the graph the symbols represent the following values:

T MAX is maximum skin temperature of the bucket
T FAN is the temperature of the bypass flow at its nozzle exit plane
T CORE is the temperature of the hot exhaust gas flow
P FAN is the absolute fan pressure
P $\alpha$ is ambient pressure
P core is absolute core pressure The nozzle system used had co-planar nozzles and the bypass ratio was approximately 5:1.

The graph clearly illustrates that, in principle, provided the ratio of the total pressures of the two flows (measured as a gauge pressure) is greater than 1.2 the skin temperature of the bucket can be kept to a low value. Clearly the actual value varies depending on the maximum engine temperature, bypass ratio, and other variables, but in general there is always a pressure ratio above which the bucket skin temperature is low enough to enable light alloys or reinforced composite materials to be used. In the engines tested a bucket skin temperature of 170° C or below could always be produced with a pressure ratio of 1.2 or greater. This means that an aluminium alloy having a safe working temperature limit of 170° C can be used in the construction of the thrust reverser, not withstanding the fact that the exhaust gases of the engine had a temperature of 500° C.

Even more remarkably, the tests showed that using a pressure ratio of 1.4 a bucket skin temperature of 120° C could be achieved bringing carbon fibre-reinforced composite resin materials, whose safe working temperatures are around 150° C, into the range of materials usable for thrust reverser buckets in our present engine/thrust reverser combination.

Thus significant savings in weight can be made using the combination of the present invention, and if the bucket is made wholly from a single skin of light alloy further weight savings can be made.

For most bypass engine cycles it is believed that the pressure ratio of greater than unity can be achieved with little or no performance penalty, but should a pressure ratio of 1.2 be too high on performance grounds, the benefits of the invention can still be utilised with a pressure ratio of less than 1.2 but using a titanium thrust reverser which has a safe working temperature up to 500° C. Titanium would not normally be used however due to its cost.

One of the advantages we have found with our novel combination is that it is not especially sensitive to the precise shape of thrust reverser buckets used and therefore there is a considerable latitude of choice available to an engine designer.

Figure 7:
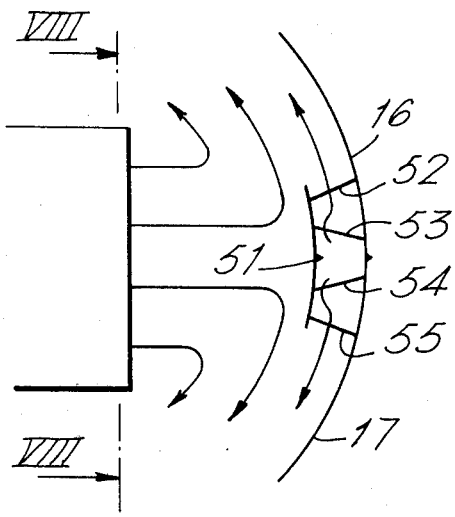
FIG. 7 illustrates a schematic view of a longitudinal section through a modification of the thrust reverser.
Figure 8:
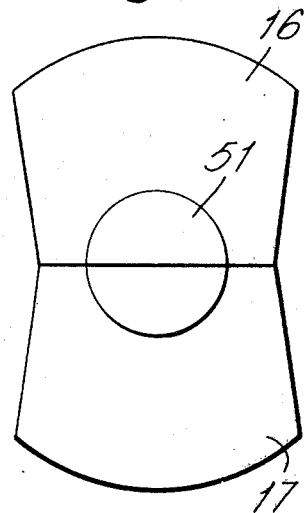
FIG. 8 is a view on the line VIII — VIII of FIG. 7.

Turning now to FIGS. 7 and 8 there is shown a modification of the thrust reverser in which a target 51 is placed upstream of the thrust reverser buckets to reverse the hot flow and to allow cooling bypass air to flow behind the target in similar fashion to that previously herein described.

The target 51 can be in the form of a dished circle made in two halves and supported from the thrust reverser buckets by struts 52, 53, 54, 55.

The target can be useful during deployment of thrust reverser buckets to prevent overheating of thrust reverser buckets prior to the establishment of the cooling flow of bypass air.

There is, however, believed to be no special problem of overheating of the thrust reverser buckets as they are deployed before the cooling air flow is established and the time period involved for such deployment is relatively small, of the order of one or two seconds.

Figure 9:
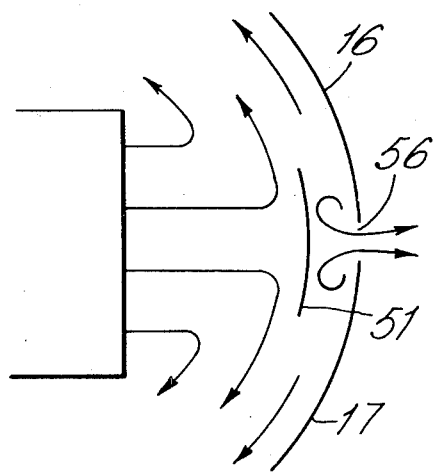
FIG. 9 illustrates a modification of the thrust reverser of FIGS. 7, 8.

In FIG. 9 is shown a modification of FIGS. 7, 8 in which a hole 56 is provided in the thrust reverser buckets immediately behind the target. This hole 56 will promote the flow of cooling bypass air behind the target but will simultaneously lead to degree of leakage of the bypass air.

Figure 10:
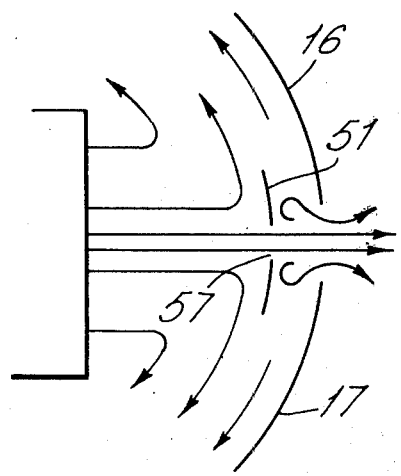
FIG. 10 illustrates a modification of the thrust reverser of FIG. 9.

In FIG. 10 there is a further modification of FIG. 9 in which a second smaller hole 57 is provided in the target so that a proportion of the hot core flow passes through this hole and further promotes the flow of cooling bypass air behind the buckets by way of an ejector effect.

We claim:

1. In the combination of a bypass gas turbine engine with a thrust reverser wherein said gas turbine engine comprises a core engine containing a casing and a nozzle, the end of said nozzle defining a first exit plane through which a relatively hot exhaust gas produced by said core engine flows, a bypass casing surrounding said core engine and defining with said core engine casing an annular bypass flow passage which terminates in a second nozzle, the end of said second nozzle defining a second exit plane located in the region of said first exit plane through which a relatively cooler bypass air produced by a compressor means flows, said core engine, bypass casing and compressor means cooperating to produce a substantially unmixed exhaust gas stream in which a cylindrical sheath of said relatively cool bypass air surrounds a core of said relatively hot exhaust gas and in which the total pressure of said relatively cool bypass air is greater than the total pressure of said relatively hot exhaust gas, and wherein said thrust reverser comprises a flow deflecting surface for altering the direction of flow of said unmixed exhaust gas, and means for deploying said flow deflecting surface to a position downstream of said gas turbine engine to intercept said unmixed exhaust gas, the improvement wherein said core engine, bypass casing and compressor means produce a total pressure of said relatively cooler bypass air which exceeds the total pressure of said relatively hot exhaust gas to a sufficient extent that said relatively cooler bypass air forms a relatively cooler barrier layer over said flow deflecting surface when said flow deflecting surface is deployed, said barrier layer serving to isolate said flow deflecting surface from said hot exhaust gas, said flow deflecting surface being made predominantly of a material which has a safe working temperature which is lower than the temperature of said relatively hot exhaust gas existing at the time said flow deflecting surface is deployed.

2. A bypass gas turbine engine and thrust reverser combination according to claim 1 wherein said core engine, compressor means and bypass casing produce a ratio of the total pressure of said bypass air flow to the total pressure of said hot exhaust gas flow of at least 1.2 : 1.

3. A bypass gas turbine engine and thrust reverser combination according to claim 1 wherein said deflecting surface is composed of a light alloy material.

4. A bypass gas turbine engine and thrust reverser combination according to claim 3 wherein said light alloy material is an aluminum alloy.

5. A bypass gas turbine engine and thrust reverser combination according to claim 1 wherein said deflecting surface is composed of a carbon fiber-reinforced composite material.

6. A bypass gas turbine engine and thrust reverser combination according to claim 1 wherein said deflecting surface comprises a pair of thrust deflecting buckets which are provided with a shield which, when said buckets are deployed forms a target on which said hot exhaust gas impinges, and which is spaced from the surface of said buckets to define an area between said shield and said bucket surface into which said relatively cooler bypass air flows.

7. A bypass gas turbine engine and thrust reverser combination according to claim 6 wherein said thrust reverser buckets are each shaped at one end to define a central hole therethrough in the deployed position.

8. A bypass gas turbine engine and thrust reverser combination according to claim 1 wherein said core engine, compressor means and bypass casing produce a ratio of the total pressure of said bypass flow to the total pressure of said hot exhaust gas flow which is in the range from 1:1 to 5:1.

9. A bypass gas turbine engine and thrust reverser combination according to claim 1 wherein said flow deflecting surface comprises a pair of thrust deflecting buckets.

* * * * *